Nov. 6, 1956

G. E. ROBERTS ET AL

2,769,977

POSITION INDICATING APPARATUS FOR
USE WITH RADIO NAVIGATION SYSTEMS

Filed Feb. 27, 1950

INVENTORS
GRAHAM ESTYN ROBERTS
JOHN BASIL COPPING
BY Walter P. Huntley
ATTORNEY

Nov. 6, 1956

G. E. ROBERTS ET AL 2,769,977

POSITION INDICATING APPARATUS FOR
USE WITH RADIO NAVIGATION SYSTEMS

Filed Feb. 27, 1950

INVENTORS
GRAHAM ESTYN ROBERTS
JOHN BASIL COPPING
BY Walter P. Huntley
ATTORNEY

Nov. 6, 1956

G. E. ROBERTS ET AL

2,769,977

POSITION INDICATING APPARATUS FOR
USE WITH RADIO NAVIGATION SYSTEMS

Filed Feb. 27, 1950

INVENTORS
GRAHAM ESTYN ROBERTS
JOHN BASIL COPPING
BY Walter P Huntley
ATTORNEY

INVENTOR
GRAHAM ESTYN ROBERTS,
JOHN BASIL COPPING

BY Walter P. Huntley
ATTORNEY

United States Patent Office 2,769,977
Patented Nov. 6, 1956

2,769,977
POSITION INDICATING APPARATUS FOR USE WITH RADIO NAVIGATION SYSTEMS

Graham Estyn Roberts, Stoneleigh, and John Basil Copping, London, England, assignors to The Decca Record Company Limited, London, England, a British company Application February 27, 1950, Serial No. 146,562

9 Claims. (Cl. 343—112)

This invention relates to chart position indicating apparatus for use with a radio navigation system having means on a vehicle such as, for example, a ship or an aircraft for producing two or more signals providing positional information from which the chart position of the vehicle can be determined.

It is an object of this invention to provide an improved form of apparatus for automatically displaying on a chart the position of the vehicle and which is particularly suited for use with hyperbolic navigation systems.

It is a further object of this invention to provide an apparatus which may readily be arranged to record on the chart the track taken by the vehicle.

According to this invention a chart position indicating apparatus for use with a radio navigation system having means on a vehicle for producing two or more signals providing positional information from which the chart position of the vehicle can be determined, comprises a chart movable to and fro in one direction, an index movable to and fro over the chart in a transverse direction, means responsive to one or more of said signals for moving the chart in said one direction in accordance with the changes in the signals representative of one co-ordinate of the position of the vehicle, and means responsive to one or more of said signals for moving the index over the chart in said transverse direction in accordance with changes in the signals representative of a second co-ordinate of the position of the vehicle, whereby the movements of the index relative to the chart correspond to the movements of the vehicle. Thus provided the chart is drawn to the proper scale and the index is initially set in the correct position relative to the chart, the index will always indicate the position of the vehicle on the chart. The chart itself will be a representative of part of the earth's surface distorted in accordance with the particular co-ordinate system which is used for control of the movements of the index relative to the chart.

The aforesaid chart may be of cylindrical form and carried on a mounting rotatable about the chart axis, the first mentioned responsive means being arranged to move the chart by rotating the mounting and said index being movable over the chart in a direction parallel to the axis of rotation of the chart. In such an arrangement interchangeable charts may be provided for covering different areas.

In another arrangement the chart may be in the form of a linearly movable strip carried over a pair of parallel spaced rollers, the index being disposed over the portion of the chart lying between the said rollers or the like. By this arrangement it is readily possible to join together a number of charts of different areas in the form of a single strip so that the chart of the required area can be selected by linear movement of the strip. The two ends of the strip may be wound respectively on carrier rollers.

The aforesaid index may be provided with a stylus arranged to mark the chart so that the movements of the index relative to the chart are recorded thereon. Thus there can be obtained a record of the actual track taken by the vehicle.

Means may be provided for periodically displacing and returning the stylus relative to the chart whereby marks are made on the recorded track of the vehicle at successive periodically recurring instants. These marks will thus indicate the time at which the vehicle was in the respective chart positions.

In one arrangement the aforesaid responsive means comprises a number of electromagnetic means responsive respectively to the positional signals provided by the radio navigational system, each electromagnetic means being arranged to rotate a member in a direction and by an amount in accordance with the changes in one of the positional signals, an adjustable gear box for selectively coupling at least two of said members to drive two output shafts so that these output shafts rotate respectively in accordance with the two co-ordinates representing the chart position of the vehicle, a first electrical transmission system for moving the chart in accordance with the rotation of one of said output shafts, and a second electrical transmission system for moving the index in accordance with the rotation of the other of said output shafts.

In a chart position indicating apparatus arranged for use with a radio navigation system of the kind providing a first control signal representative of the difference in distances of the vehicle from a master station and a first slave station and a second control signal representative of the difference in distances of a vehicle from the master station and a second slave station, one of said responsive means may be arranged to effect a movement proportional to the sum of the distances represented by the two control signals and the other responsive means arranged to effect a movement proportional to the difference of the distances represented by the two control signals. As explained hereinafter, by this arrangement, provided the actual distances are converted into movement on the same scale, it is possible to reduce considerably the distortion of the chart over large areas of the coverage of the hyperbolic navigation system of the kind referred to.

It is the usual practice in hyperbolic navigation systems to employ a master station and three slave stations spaced from the master station, means being provided on the vehicle for producing three control signals representative respectively of the difference of the distances of the vehicle from the master and each of the three slave stations. In the chart position indicating apparatus for use with such a navigation system providing three control signals selecting means may be provided for selectively coupling said control signals to the responsive means so that one of said responsive means is arranged to effect a movement proportional to the difference of the distances represented by any selected pair of control signals and the other responsive means is arranged to effect a movement proportional either to the sum of the distances represented by said selected pair of control signals or to the differences of the distances represented by another pair of control signals or to the sum of the distances represented by all three control signals.

Means may be provided for adjusting the ratio between the extent of movement in a co-ordinate direction of the index and/or chart and the corresponding change of position of the vehicle as determined from the signals provided by the ratio navigation system whereby the relative scales of the chart in the two coordinate directions may be chosen to minimise distortion.

The following is a description of a number of embodiments of the invention, reference being made to the accompanying drawings in which.

Figure 11:
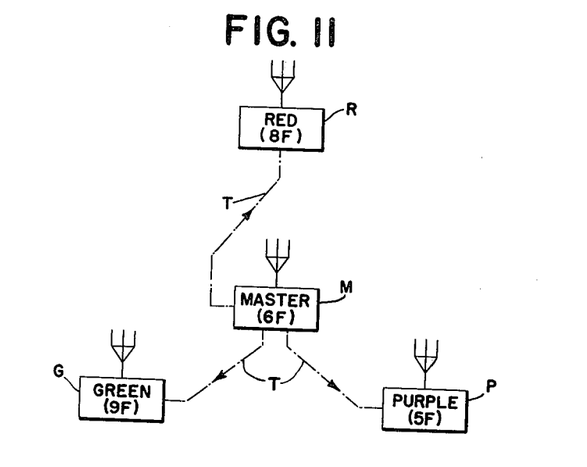
Figure 11 is a block diagram of the transmitting apparatus of a phase comparison radio navigation system of the kind for operation with which the apparatus of this invention is arranged to be used.

The apparatus about to be described is particularly arranged for operation with a phase comparison radio navigation system of the kind described in U. S. Patent No. 2,530,903, issued November 21, 1950 to the assignee of this application. This navigation system employs a master station M (Figure 11) and three slave stations R, G, and P spaced apart from one another and from the master station, these slave stations and controlled as to frequency and phase by the master station M as diagrammatically shown at T being known respectively as the red, green and purple slaves. Radio signals of different harmonically related frequencies, such as the 6th, 8th, 9th, and 5th harmonics of a given fundamental frequency F, are radiated from the four stations and a receiver in the vehicle (see Figure 12) is arranged to compare the phase of the signal received from each of the slave stations, R, G, and P with the signal received from the master station M. This phase comparison is effected by separately receiving the four signals in appropriately tuned receiving channels RM, RR, RG, and RP and bringing the two signals of each pair to be compared to a common comparison frequency by means of frequency converters FC connected to the outputs of the receiving channels as shown. The frequency converters FC provide six output signals comprising three pairs of signals of like frequency comprising the 24th, 18th, and 30th harmonics, respectively, of the given fundamental frequency F. These three pairs of like frequency signals are applied to phase discriminators 10, 11 and 12, respectively. Each of these phase discriminators produces two D.C. potentials proportion respectively to the sine and cosine of the phase angle between the inputs to the phase discriminator. In the receiving apparatus described in the aforementioned patent the sine and cosine signals representative of the phase difference between master and slave signals are applied to phase angle indicators having registering mechanisms for counting complete cycles of phase change. The chart position indicating apparatus hereinafter described is controlled directly by these D. C. potentials representative of the phase angles between the received radio signals.

Figure 1:
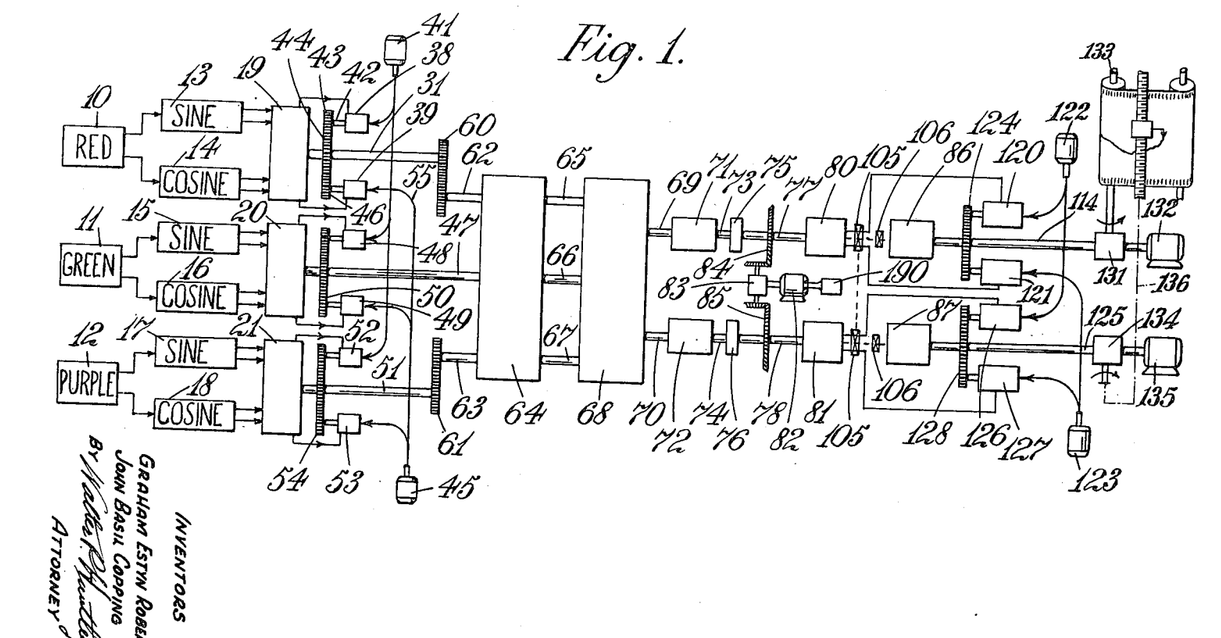
Figure 1 is a schematic diagram representing one construction of the apparatus.
Figure 2:
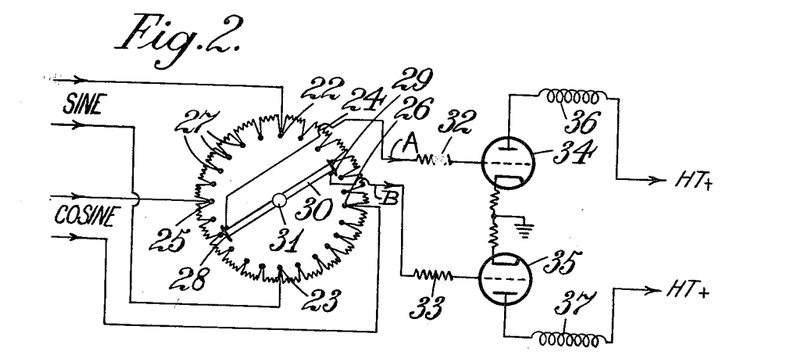
Figure 2 is a circuit diagram of one of the units of the apparatus of Figure 1 for converting the received signals into rotary movement.

Referring to Figure 1, the three phase discriminators 10, 11 and 12, which constitute three sources of sine and cosine potentials corresponding respectively to the phase relationships between the received red, green and purple slave signals and the master signal provide six signal potentials which are first converted into positive and negative potentials balanced about earth by the signal reversal and D. C. amplifier units 13–18 and then applied to the electromagnetic devices indicated by the rectangles 19–21 which are arranged to convert the electrical signals into a rotational movement of an extent proportional to the phase angles determined by the discriminators of the radio navigational system. Figure 2 is a simplified diagram of one of these units wherein the sine signals from, for example, the unit 13 are applied to two diametrically opposite points 22, 23 of the ring resistor 24. The cosine signals from the unit 14 are applied to diametrically opposite points 25, 26 which are situated on a diameter at right angles to the line 22, 23. The ring resistor is formed of a number of resistors connected to the contact studs 27 which are traversed by the brushes 28, 29 on a brush carrying member 30 carried by a shaft 31. Since the potentials applied to the ring resistor are proportional to the sine and cosine of a phase angle, there will be no potential difference between the brushes 28, 29 when the member 30 is in an angular position corresponding to the measured phase angle. If the member 30 is for any reason displaced from this position, there will be a potential difference between the brushes having a sign depending on the direction of the displacement. The brushes 28, 29 are connected respectively by the leads A, B through the high resistances 32, 33 to the control grids of the valves 34, 35. The anode circuits of these valves include the operating coils 36, 37 of a pair of electromagnetic clutches 38, 39 (Figure 1). The circuit is arranged so that if the brush carrying member 30 is displaced from the position corresponding to the measured phase angle, one or other of the valves 34, 35 conducts, according to the direction of displacement of the member 30, and so operates the appropriate clutch.

Referring to Figure 1, the input side of clutch 38 is mechanically coupled as indicated to a continuously running electric motor 41. Thus when the clutch is operated, the output shaft 42, by means of the gears 43, 44 drives the shaft 31 on which is mounted the brush carrying member 30. The direction of rotation of the motor 41 is such that if the member 30 is displaced away from the position corresponding to the measured phase angle in a direction such that clutch 38 is operated, the shaft 31 is rotated to bring the member 30 back to that position. The input of clutch 39 is mechanically coupled as indicated at 55 to an electric motor 45 which runs continuously in the opposite direction to motor 41. The clutch 39 when operated drives the shaft 31 by means of a gear 46, the direction of rotation being in the opposite direction to that which occurs when clutch 38 is operated. It will thus be seen that this mechanism will serve to keep the shaft 31 positioned at an angle corresponding to the measured phase angle between the received red slave and master signals.

Similarly, the ring resistor unit 20 has a shaft 47 which is driven in accordance with the phase comparison between the received green slave and master signals by the motors 41, 45, the electromagnetic clutches 48, 49 and the gears 50. Likewise, the unit 21 has an output shaft 51 which is driven in accordance with the phase comparison between the received purple slave and the master signals by the motors 41, 45 through the electromagnetic clutches 52, 53 and the gears 54. It will be appreciated that there is no need to provide two separate continuously running motors 41, 45 and in actual practice a single motor may be employed, suitable gearing being provided to make two shafts rotate continuously in opposite directions, the three clutches 38, 48 and 52 being associated with one shaft and the other three clutches 39, 49, 53 being associated with the second shaft.

Figure 12:
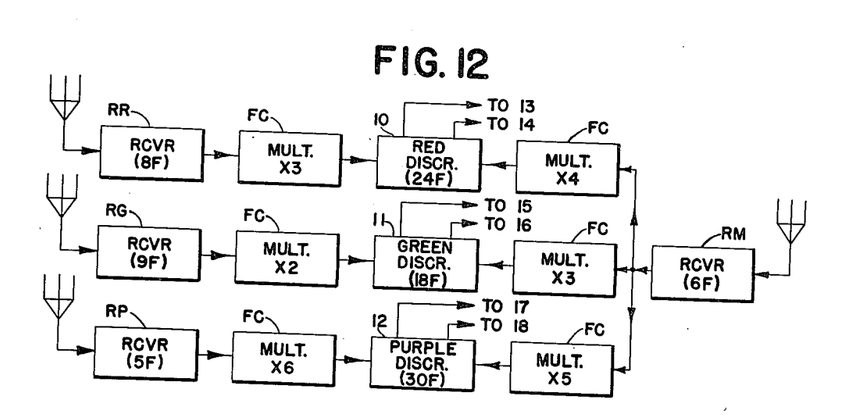
Figure 12 is a block diagram of the radio receiver portion of the apparatus showing the frequency conversion and phase comparison devices for providing the sine and cosine potentials used to operate the apparatus of Figure 1.

The actual relationship between the angular rotation of the shafts 31, 47 and 51 and the distance traversed by the vehicle depends on a number of factors including in particular the frequencies at which the respective phase comparisons are made. If the master transmitter transmits on the 6th harmonic of a fundamental and the three slaves on the 8th, 9th and 5th harmonics as described it is convenient to make the three phase comparisons on the 24th, 18th and 30th harmonics respectively, as indicated in Figure 12. Thus, in movement along the base line between the green slave which radiates on the 9th harmonic and the master, a greater distance will have to be travelled to obtain one complete cycle of phase change at the discriminator which compares the received green slave and master signals at a comparison frequency of the 18th harmonic than would have to be travelled along the base line between the purple or 5th harmonic slave and the master to obtain one complete cycle of phase change at the discriminator which compares the received purple and master signals at a comparison frequency of the 30th harmonic. For reasons to be described hereinafter, in order to reduce the distortion of the chart, gearing 60, 61 is provided to change the angular rotations of the shafts 31 and 51 respectively in such a ratio that the shafts 62, 63 turn through angles corresponding to the rotations which would have been made if all three phase comparisons were made at the same reference frequency. Thus the movements of shafts 31 and 51 are geared down respectively in the ratios of four to three and five to three.

The three shafts 62, 47 and 63 are coupled to the input of a gear box 64 which has three output shafts 65, 66 and 67. This gear box is arranged so that the three output shafts may be coupled to the three input shafts in any one of the three cyclic orders that is to say, the shaft 65 may be driven in accordance with the red signals, shaft 66 green and shaft 67 purple or the shaft 65 green, shaft 66 purple and shaft 67 red or shaft 65 purple, shaft 66 red and shaft 67 green. The shafts 65-67 provide the input drives to another gear box 68 which has two output shafts 69, 70. The gear box 68 contains a differential gear arranged so that the shaft 69 is driven in accordance with the difference of the angular rotations of the input shafts 65, 66. It is to be noted that the three input shafts must be considered to have similar arbitrarily defined positive and negative directions of rotation and it will be assumed that the positive direction of rotation is that which corresponds to a movement of the vehicle increasing the value of the quantity representing the distances of the vehicle from the master station minus the distance of the vehicle from the appropriate slave station. The gear box 68 provides three alternative drives for the shaft 70; this shaft may be driven through a differential in accordance with the difference of the rotations of shafts 65 and 67 or it may be driven in accordance with the sum of the rotations of shafts 65 and 66 or it may be driven in accordance with the sum of the rotations of all three input shafts 65, 66 and 67.

The shafts 69, 70 are coupled respectively to the inputs of the change-speed gear boxes 71, 72, each of which boxes provides sixteen speed ratios between its input and output shafts. Conveniently these ratios may be made in steps of approximately 1.2 to 1 so as to provide sixteen ratio steps between one to one and approximately sixteen to one. The output shafts 73, 74 of the gear boxes 71, 72 are coupled through the loose couplings 75, 76 to the input shafts 77, 78 of the servo transmitter units 80, 81. The loose couplings, which may conveniently comprise dog clutches, are employed to provide a certain amount of backlash in the drives to the transmitter units for a reason to be described later. Normally this backlash is taken up by a D. C. electric motor 82 which is arranged to apply a small torque in one direction to the differential shaft of a differential gear 83, the two inputs of which are coupled as indicated at 84, 85 to the shafts 77, 78. The torque of the motor 82 is made so small that it cannot turn the shafts 77, 78 to drive the gear boxes 64, 68, 71 and 72 but it biases the shafts in one direction to take up the backlash due to the couplings 75, 76.

Figure 3:
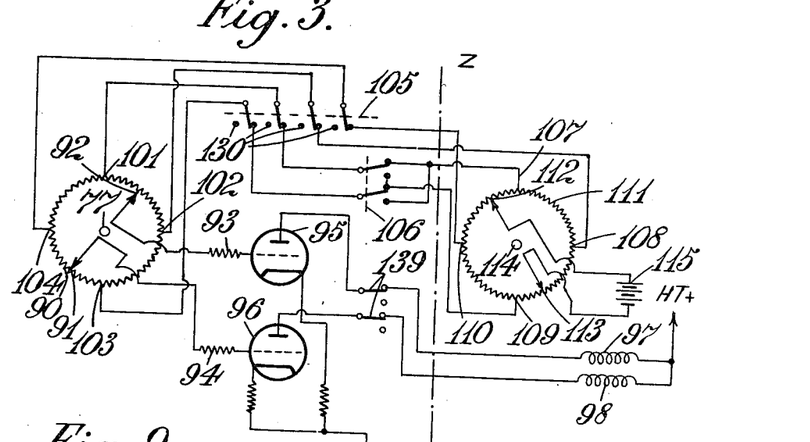
Figure 3 is a diagram of one of the transmitter and receiver units for driving the remote display apparatus.

The servo transmitters 80, 81 are similar and serve to transmit the rotational movement of the shafts 77, 78 from the apparatus thus far described, which may be disposed at any convenient location in the vehicle to receivers 86, 87 at the chart indicator which is to be used by the pilot or navigator. In Figure 3 there is illustrated diagrammatically one of the transmitters and its associated receiver, the transmitter being to the left of the chain dotted line ZZ and the receiver to the right. The transmitter comprises a ring resistor 90 which may comprise a number of fixed resistors connected to studs and a pair of rotatable brushes 91, 92 disposed at opposite ends of a diameter and mounted on the shaft 77 in the transmitter 80 (or shaft 78 in the transmitter 81). The two brushes are connected through resistors 93, 94 to the control grids of the valves 95, 96, the anode circuits of which contain the operating coils 97, 98 of a pair of electromagnetic clutches. Four points 101, 102, 103, 104 spaced 90° apart on the ring resistor 90 are connected through the switches 105, 106, described later, to four similar points 107, 108, 109, 110 on a ring resistor 111 in the receiver. This ring resistor 111 is similar to the resistor 90 and is provided with two brushes 112, 113 disposed at opposite ends of a diameter and carried on a shaft 114. A source of direct potential indicated diagrammatically as a battery 115 is connected between the two brushes 112, 113.

It will be seen that if the points 101–104 on resistor 90 are connected respectively to points 107–110 on resistor 111 as indicated by the switch position shown, then there will a potential between the brushes 91, 92 unless these brushes are in a position exactly at right angles to the position corresponding to the setting of brushes 112, 113. The sign of the potentials of brushes 91, 92 will depend on the direction of displacement. The circuits of the valves 95, 96 are similar to those of valves 34, 35 in Figure 2 and arranged so that if the shafts of the transmitter and receiver are not in the relative position which produces zero voltage on brushes 91, 92 one of the valves 95, 96 conducts so energising one or other of the clutch coils 97, 98.

The clutch coils 97, 98 control the clutches 120, 121 (Figure 1) through which the continuously running electric motors 122, 123 can drive the shaft 114 through the gearing 124. The two motors run in opposite directions and serve to make the shaft 114 of the receiver 86 follow the movements of the input shaft 77 of the transmitter 80 in a manner similar to the previously described method by which the shafts 31, 47 and 51 are controlled. The second receiver 87 similarly controls the position of the shaft 125, the actual rotation of the shaft being effected by the motors 122, 123 through the clutches 126, 127 and gearing 128.

Referring to Figure 3, the switch 105 has four changeover contacts for disconnecting the points 101–104 of ring resistor 90 from the ring resistor 111 of receiver 86 and connecting them through the contacts 130 to the ring resistor of the other receiver 87. As indicated diagrammatically in Figure 1, the switches 105 in the two transmitters are ganged so that a single operation interchanges the connections to the two receivers. The switch 105 also has another pair of changeover contacts 139 (Figure 3) for changing over the connections to the clutch windings so that the clutches associated with the appropriate receiver are energised.

The switch 106 (Figures 1 and 3) is a reversing switch which interchanges the connections between the points 107 and 109 on the ring resistor 111 so reversing the relative directions of rotation of the shafts of the receiver and transmitter.

The shaft 114 is arranged to drive one input of a differential gear 131, the other input of which is provided by an electric motor 132. The output shaft 133 of this differential gear is arranged to drive the cursor as will be described later. Similarly the shaft 125 is coupled to one input of a differential gear 134, the other input of which is provided by an electric motor 135 and the output shaft 136 is used to drive the chart. The motors 132 and 135 are provided for a purpose to be described later and normally their rotors remain stationary so that the output shafts 133 and 136 will follow exactly the respective movements of shafts 114 and 125.

Figures 4, 5, 6:
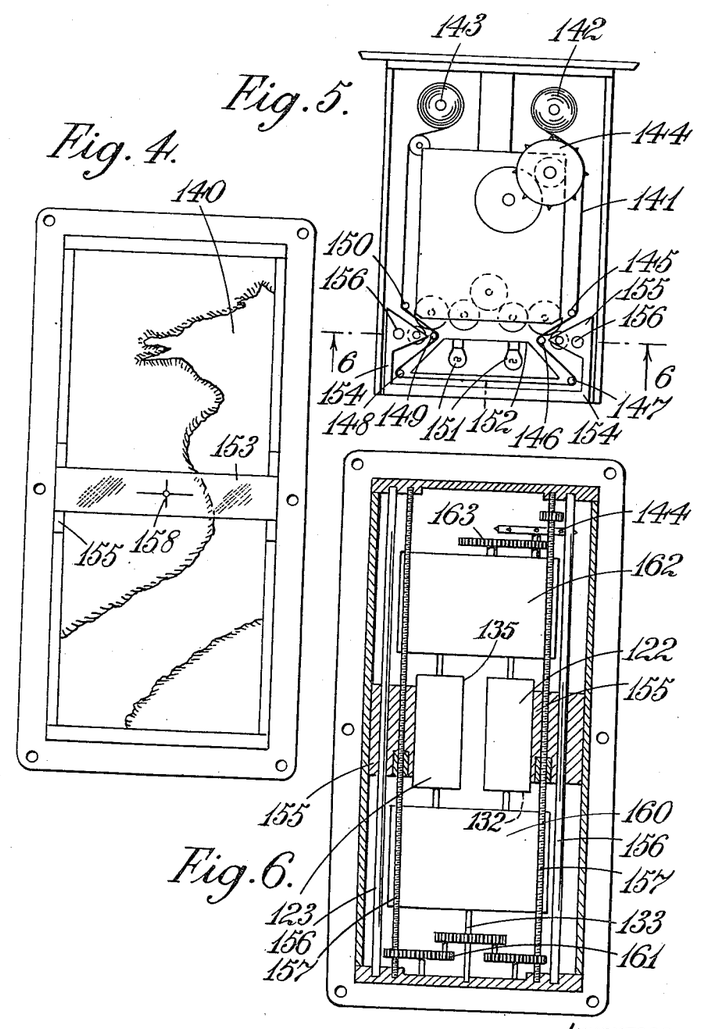
Figure 4 is an elevation of one form of chart and index assembly.
Figure 5 is a plan view of the assembly of Figure 4 with the top cover removed.
Figure 6 is a section on the line 6—6 of Figure 5.

In Figures 4, 5 and 6, the construction of one form of chart and cursor assembly with the associated receivers and drive units is shown. This unit is designed as a flush-fitting panel unit with the visible part of the chart display covering nearly the whole of the panel area occupied by the unit. The chart 140 is drawn on a long strip 141 which conveniently may bear a number, for example about ten or twelve, of separate charts disposed along the length of the strip. The two ends of the strip are wound upon rollers 142, 143 which are spring loaded to keep the strip in tension. From the roller 142, the strip 141 runs around the sprocket wheel 144 which engages sprocket holes along the edges of the chart, thence around the bearing rollers 145, 146 and 147 across the front of the unit, around bearing rollers 148, 149 and 150 and so to the chart carrying roller 143. Behind the displayed portion of the chart extending across the front of the unit, there are arranged a number of lamps 151 and a reflecting screen 152 to illuminate the chart. A transparent cursor 153 in front of the displayed part of the chart is carried by the rearwardly extending arms 154 which have inwardly extending portions 155 slidably carried on the slide bars 156. The cursor is traversed in a vertical direction across the chart by means of the lead screws 157 and on the face of the cursor there is provided an index formed by cross-lines, at the intersection of which a stylus 158, conveniently a pencil lead, is mounted so that movements of the stylus over the chart are recorded thereon.

To change a chart strip the strip is wound on to one of the rollers 142, 143 by means of the motor 135 (located behind the motor 123 as seen in Figure 6) as described later and the roller withdrawn. The new chart is wound on the roller, which is then inserted in the display unit and the chart strip threaded around the unit so that the free end can be wound upon the other of the carrier rollers.

The motors 122, 123 are mounted centrally inside the display unit as shown in Figure 6 and beneath them is disposed the receiver assembly 160 comprising the unit 87 with its associated clutches 126, 127 and gears 128 and 136. The motors 132 and 135 are located behind the motors 122, 123. The output shaft 133 of this assembly drives the two lead screws 157 simultaneously through gearing 161 to effect vertical movement of the cursor. The second receiver assembly 162 comprising the unit 86 with its associated clutches 120, 121 and gears 124, 131 is disposed above the four motors and is coupled through the gearing 163 to drive the sprocket wheel 144 for moving the chart horizontally.

Figure 7:
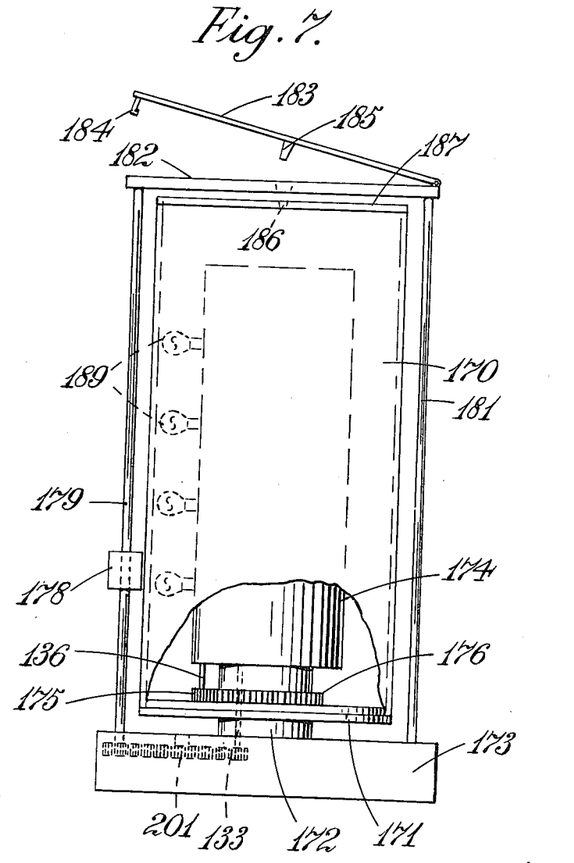
Figures 7 and 8 are respectively side and front elevations of a second form of display unit, part of the chart being cut away in Figure 7 to show the internal construction.
Figure 8:
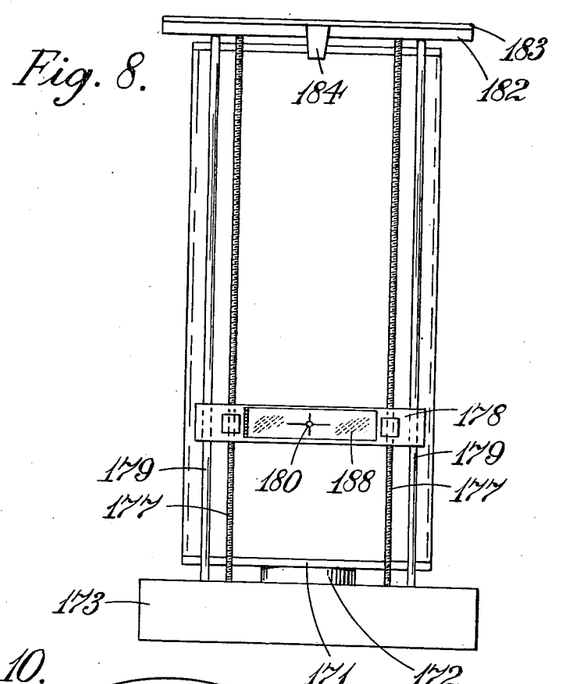

An alternative construction of display unit using a cylindrical chart is illustrated in Figures 7 and 8, Figure 7 being a side view with part of the chart cylinder 170 cut away and Figure 8 being a front view. The chart is printed on or fixed to the outer surface of the cylinder 170 which fits on to a plate 171 rotatably mounted on a fixed hollow shaft 172 carried by a base plate 173. The motors 122, 123, 132, 135, clutches 120, 121, 126 and 127 and the receiver units 86, 87 (Figure 1) are arranged inside in a fixed casing 174 carried on the shaft 172 inside the chart cylinder 170, all the connecting wires being taken through the centre of the shaft 172. The two output shafts 133 and 136 extend down through the bottom of the casing 174. Shaft 136 carries a gear wheel 175 which meshes with a wheel 176 secured to the plate 171 and rotatable on the hollow shaft 172 so that output shaft 136 when driven rotates the plate 171 and the chart cylinder 170 carried thereon. The other output shaft 133 extends through the bore of the hollow shaft 172 and through gearing 201 drives in synchronism the two lead screws 177 (Figure 8) for traversing a cursor 178 along the two slide bars 179. The cursor is provided with an index formed by cross-lines at the intersection of which a stylus 180 is mounted as in the previously described arrangement.

The two slide bars 179 together with a third pillar 181 (Figure 7) support a circular frame 182 at the top of the display unit. This frame has bearings for the top ends of the lead screws 177 and also carries a hinged lid 183 shown partly raised in Figure 7, having a spring catch 184 for securing it in the closed position. In the centre of the lid is a downwardly extending conical projection 185 which, when the lid is closed fits into a circular hole 186 in the centre of a cross bar 187 extending across the top of the chart cylinder so ensuring that the cylinder is properly located. The frame 182 is of sufficient size to allow the chart cylinders to be withdrawn and replaced so that charts may readily be interchanged by withdrawing one cylinder and substituting a second cylinder. Provision is made for removing the stylus from the chart to prevent it being damaged whilst cylinders are removed or inserted. The stylus 180 is therefore mounted in the centre of a transparent plate 188 (Figure 8) which is hinged at one end to the cursor 178. Thus when required the stylus mounting can be swung away from the chart cylinder. Preferably the charts are drawn on sheets of paper which can be secured on the chart cylinders. Two such cylinders would be provided so that when one chart is in use in the apparatus, the chart covering the next part of the track of the vehicle can be put on a cylinder ready for insertion in the display unit. Thus, when the end of the first chart is reached, the hinged lid 183 is opened, the stylus is swung away from the chart and the chart cylinder removed and replaced by the new chart cylinder.

The chart cylinder 170 is made of transparent material and lamps 189 (Figure 7) to illuminate the chart are mounted on the front surface of the casing 174 under the region of the chart traversed by the cursor. It will be noted that the display unit may be disposed remotely from the remainder of the apparatus. The display unit can be made of a convenient size for fitting in pilot's cockpit of an aircraft and is preferably mounted on an adjustable mounting so that it can readily be set in any desired position.

It will be seen that the two constructions of display units described, although differing considerably in mechanical construction, both provide an arrangement in which the cursor is traversed in one direction across a chart in accordance with the rotation of the output shaft 133 (Figure 1) and the chart itself is moved in a transverse direction in accordance with the rotation of the shaft 136. The ensuing description of further features of the apparatus and its operation will therefore, except where otherwise indicated, apply to both constructions of display unit.

Thus, in both constructions, to prevent damage to the apparatus if the vehicle should move out of the area covered by the chart, limit switches are provided, which interrupt the vertical drive circuit if the cursor is moved beyond the ends of the chart.

Further features of the apparatus will be clearer if the operation is first considered. It has already been explained that the three units 10, 11 and 12 of Figure 1 each provides D. C. potentials representative of the difference in distance between the master station and the respective slave stations, i. e. each unit provides potentials indicating that the vehicle lies on one hyperbola of a family of hyperbolae having the master station and the appropriate slave stations as foci. The position of the vehicle could be determined from the intersection of any two such position lines. It is the usual practice, for various reasons which need not be considered now, to arrange the three slave stations at the three vertices of a triangle with the master station inside the triangle preferably equally distant from the three slave stations. In such an arrangement, if any small area outside the triangle is considered, any two sets of intersecting hyperbolic position lines can be regarded as two sets of approximately parallel straight lines intersecting at an angle. Provided the scales of the two patterns are the same, that is to say, the successive position lines in the two sets represent equal changes in the measured differences of distance from the stations, these intersecting patterns will form series of parallelograms having equal sides. As is well known, the diagonals of such a parallelogram intersect at right angles. Therefore if there are used as two co-ordinates the sum and the difference of the two measured differences in distances, the two sets of co-ordinate lines on the chart in this area will be at right angles to one another.

In the apparatus described, the cursor and the chart are moved in directions at right angles to one another, and thus, if the two movements are controlled in accordance with the sum and difference co-ordinates respectively, the scales in the two directions being suitably chosen, for small areas the chart is substantially undistorted. It is to be noted, however, that any chart of an area is drawn in accordance with the particular co-ordinates which will be used to drive the cursor and chart movement. Thus any distortion of the chart does not affect the accuracy of the positional information in any way, the geographical position of the vehicle being accurately represented on the chart by the position of the index. By reducing the chart distortion in the manner described, however, navigation of the vehicle is facilitated, since the appearance of the chart corresponds more closely to the familiar undistorted charts normally used for navigation purposes.

Figure 10:
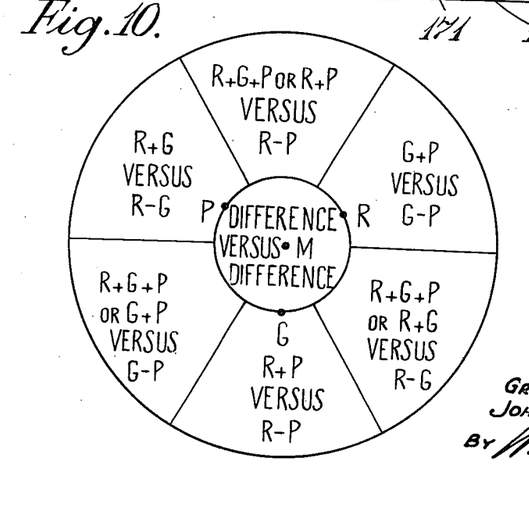
Figure 10 is a diagram showing the regions in which various co-ordinates are employed for controlling the chart display.

When using the information from only two of the three hyperbolic patterns in the manner just described, it will be understood that the pair of intersecting patterns giving the most accurate information is selected as is the usual practice in hyperbolic navigation systems. Figure 10 is a diagram showing a typical example of the relative positions of the master station M and the red, green and purple slaves, R, G and P. This diagram illustrates the areas in which various co-ordinate patterns are of particular utility. The expressions $R+G$, $R-G$ are used to indicate the sum and difference of the red and green primary co-ordinates; similarly $R+P$, $R-P$ indicate the sum and difference of the red and purple primary co-ordinates and so on.

In the region around the master station, each of the primary hyperbolic patterns representing the difference of distance between the master station and a slave station provides a series of sharply curved position lines. By obtaining the difference between the co-ordinates representative of a pair of primary hyperbolic patterns, a secondary hyperbolic pattern is obtained having two slave stations as foci. For example, if the reading representative of the difference in distance of the red slave from the master is subtracted from the reading representative of the difference in distance of the green slave from the master, the result represents a hyperbolic position line having the red and green slaves as foci. By using two such difference patterns having different pairs of slave stations as foci, a suitable intersecting co-ordinate pattern can be obtained for use in the region around the master station.

When a pair of differences is used, one slave contributes to both co-ordinates. In the locality of that slave, double ambiguities occur since the pair of derived secondary hyperbolae intersect in two places. The arrangement of differences used should therefore place the region of ambiguities in the least frequently used part of the chart or the part furthest removed from the track or region of greatest interest. It will be realised, however, that there is an appreciable overlap of the various areas in which particular sets of co-ordinate combinations are serviceable.

As is described in the specification of British Patent No. 643,381, if the three primary hyperbolic co-ordinates are added together algebraically, a pattern comprising a series of closed curves extending around the master station is obtained. In some parts of the region outside the area enclosed by the three slave stations this pattern will give less distortion than with a pattern using the sum of only two primary co-ordinates. The sum of the three primary co-ordinates need not ever be used but in the three regions indicated on Figure 10, it offers the advantages of a reduction in distortion although at the expense of a very slight reduction in accuracy. If the sum of the three primary co-ordinates is used in the areas diametrically opposite to the recommended ones, a very slight increase in accuracy is obtained at the expense of a considerable increase in distortion.

It will be appreciated that there are many ways in which the three primary hyperbolic patterns and/or patterns derived therefrom can be utilised to give an intersecting co-ordinate pattern. It has been found, however, that the three types of co-ordinate patterns described above will in general meet all the requirements, and the gear boxes 64, 68 in Figure 1 are arranged to provide drives for the cursor and chart in accordance with these three types of co-ordinates. It will be obvious, however, that by suitable construction of the apparatus, the movements of the cursor and chart might be controlled directly in accordance with two of the primary positional determinations if it is desired to simplify the construction of the apparatus, at the expense of having greater chart distortion.

Referring to Figure 1, the three input shafts 62, 47, and 63 of gear box 64 rotate in accordance with the red, green and purple co-ordinates as determined by the units 10, 11 and 12 respectively, suitable scale corrections being introduced by the gearing 60, 61, so that these input shafts rotate through angles corresponding to the changes in phase angle which would occur if all three phase comparisons were made at the same frequency. As previously explained the output shaft 69 of gearbox 68 rotates in accordance with the difference of the rotation of shafts 65, 66, and hence turns through angles representative of the difference of any pair of the red, green and purple co-ordinates, the pair being selected by the gearbox 64. The rotation of shaft 69 is applied through the gearbox 71 and the transmitter 80 to drive either the cursor through the receiver 86 or the chart through the receiver 87 according to the setting of the changeover switch 105.

The second output shaft 70 of gearbox 68 rotates in accordance with the sum of the two primary co-ordinates whose difference is applied to shaft 69, or in accordance with the sum of all three primary co-ordinates or in accordance with the difference of two primary co-ordinates. In this latter case it will be noted that shaft 69 is driven in accordance with the difference of rotations of shafts 65 and 66, and may, for example, be red minus green. Shaft 70 is driven in accordance with the difference of rotations of shafts 65 and 67, and in the example would be purple minus red. If it were desired to use red minus green and green minus purple, green minus purple can be applied to shaft 69 by means of gear boxes 64 and 68, and then red minus green can be applied to shaft 70 by means of gear box 68. The rotation of shaft 70 is applied through gearbox 72 and the transmitter 81 to drive either the chart through receiver 87 or the cursor through receiver 86 according to the setting of the changeover switch 105.

The gearboxes 71 and 72 enable the scale relationship between the rotations of the shafts 69 and 70 and the corresponding cursor and chart movements to be adjusted so that the area of ground covered by a chart of fixed size can be selected to suit the requirements. For example, for navigating an aircraft along a fixed route, relatively large scale charts of the neighbourhood of the airports may be required, whereas much smaller scale charts could be used for the main parts of the journey between the airports. Furthermore, the gearboxes 71, 72 enable the relative scales of the movements of the cursor and chart to be adjusted to minimise distortion of the chart.

The interchange switch 105 enables the connections between the transmitters 80, 81 and receivers 86, 87 to be interchanged so that the appropriate movements can be applied to the cursor and chart in accordance with the desired orientation of the chart. The reversing switches 106 enable the relative directions of the receiver input and transmitter output to be reversed so that the chart and cursor will be moved in the correct directions appropriate to the chart.

It will be appreciated that each chart will be drawn for one particular setting of the controls for the gearboxes 64, 68, 71 and 72 and the switches 105, 106. Preferably, all the adjustments are applied from a control panel which would have a number of multi-position switches for controlling electrically cam mechanisms for adjusting the gearboxes. The switches on the control panel are arranged to pre-select the required control settings, and a single operation button is provided to effect the necessary operations after the switches have been adjusted. To ensure that the teeth in the various gearboxes move into mesh when a new combination is selected, initially charged condensers may be connected between the grids of each pair of valves 34, 35 (Figure 2) by means of a relay actuated by the operating relay so making the output shafts 31, 47, 51 hunt, contacts being provided to disconnect the condensers when the gear operating mechanism has moved to gears into mesh. It will be seen that when the appropriate chart is put in the display unit and the controls are correctly set, if the cursor index is initially set over the position on the chart corresponding to the actual position of the vehicle the index will then follow on the chart the movements of the vehicle as determined by the receiver of the radio navigation system. The stylus will mark the chart so that a record is kept of the track of the vehicle.

To enable the cursor and chart to be initially set to positions corresponding to the position of the vehicle, use is made of the motors 132, 135 (Figure 1). It will be seen that if the motor 132 is running, the differential gear 131 will drive the shaft 133 and so traverse the cursor over the chart. The motor is provided with a reversing switch to control the direction of rotation and an operating key so that it can be set in motion, as required, to effect adjustment of the cursor. Similarly the motor 135 is used to effect the required adjustment of the chart. In the display apparatus of Figures 4, 5 and 6, the motor 135 is also used to traverse the chart strip when a change from one chart to another on the same strip has to be effected.

As previously indicated this apparatus is arranged particularly for use with the radio navigation system described in U. S. Patent No. 2,530,903. Such a navigation system is usually arranged so that the indication at the receiver changes by a number of complete cycles in traversing the field of the system, an indicator being arranged to indicate the fraction of a cycle and a registering device being provided for indicating the number of complete cycles of change through which the indicator has moved. By this arrangement very accurate positional information may be provided over a large area by a single transmitting system. The signals received at the location of the receiver at any instant determine the indicator position within one cycle. The particular cycle which is representative of the location of the receiver is determined by the registering device and possibly also by some auxiliary or modified transmissions which provide a coarse position indication. If the indicator is initially set up to the correct fraction of a cycle (which, for example, may readily be done in the system described in said U. S. Patent No. 2,530,903 by a reference signal generator in the receiver), the indication of the fraction of a cycle will be unaffected by any errors which may occur in the setting of the registering device. In the chart display apparatus described in the present specification, the initial setting of the cursor position on the chart will normally be made by reference to printed co-ordinate lines on the chart and the normal co-ordinate indicators of the navigation system receiver, since, for example, if the chart is to be changed during the course of a journey, the navigation system may be the only source of exact information as to the position of the vehicle. The coordinate lines may be printed on the back of the chart so that they are only visible when the chart is brightly lit from behind and suitable additional lighting would be provided for use during such adjustments; these co-ordinate lines would be two of the primary indications which are shown directly on the indicators of the navigation system receiver. The cursor position on the chart is representative both of the fraction of a cycle and of the number of complete cycles and it is convenient to have means for altering the setting of the cursor or chart by one or more complete cycles without affecting the setting of the fraction of a cycle.

This may readily be achieved by disconnecting the leads A, B from the grids of the valves 34, 35 in Figure 2 and connecting the grid leads so that one valve is conductive and the other non-conductive. This energises one of the clutches of the pair so that the shaft 31, 47 or 51 is driven in one or other direction according to which valve is conductive. The cursor or chart will be driven simultaneously through the shafts 133 or 136. When the cursor is in approximately the desired position over the chart, the grid connections of the valves are restored to normal, and the mechanism will then operate in the normal way to take up a position representative of the particular fraction of a cycle determined by the input signals. Thus even if the fraction of the cycle changed slightly during this process, when the connections are restored to normal, the index will be positioned over the chart correctly in accordance with the changed fraction of the cycle and there is no need for the operator to make any fine adjustments.

As described above, the stylus records on the chart the track of the vehicle. It is desirable to have timing marks on this record so that not only is the track recorded but there is also known the exact time at which the vehicle was at certain points on the track. These timing marks are made by moving the stylus relative to the chart over a path forming a small closed figure, for example a square, thus providing a recognisable mark on the chart whatever is the actual direction of the recorded track on the chart. These marks are made at predetermined time intervals, for example every five or ten minutes, and for this purpose it is necessary to have some timing device. A suitable clock might be used, but when this indicating apparatus is used with the radio navigation system described in copending application Serial No. 120,054, filed October 7, 1949, now Patent No. 2,690,559, issued Sept. 28, 1954, assigned to the assignee of this application, it is convenient to employ one of the lane identification signalling impulses which are used in that navigation system, so ensuring the accurate timing of the marks. So far as the present invention is concerned, the duration and use of the impulses is immaterial and it will suffice to say that a negative going impulse occurring once per minute is available in the navigation system receiver. To guard against the possibility of failure to receive one of these impulses, the received impulses are preferably used to synchronise a local timing device which provides the operating pulses once every five or ten minutes as required. The timing device may for example have a wheel which makes a complete revolution once every ten minutes and has two contacts spaced 180° apart which co-operate with a fixed brush to complete a circuit once every five minutes. This brush contact is arranged to operate a relay having a changeover contact.

Figure 9:
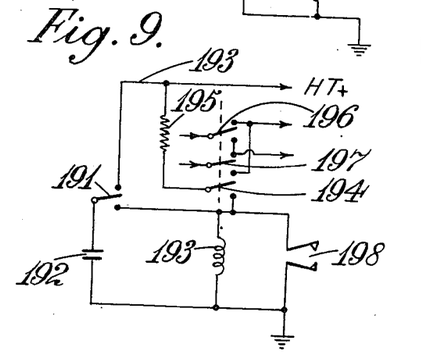
Figure 9 is a circuit diagram of the control circuit for applying the timing marks.

Referring to Figure 1 the timing device and its associated circuit, which is indicated diagrammatically by the rectangle 190, is coupled to the motor 82 to reverse for a short period the direction of the torque applied by the motor 82 to the differential gear 83. The reversing circuit is shown in Figure 9 in which the contact 191 is a changeover switch contact which is operated by the timing device. Normally this switch contact connects a condenser 192 between the high tension lead 193 and earth so that the condenser is kept charged. When the contact 191 changes over, the condenser 192 is discharged through the coil 193 of a relay which operates, closing the self-holding contact 194 which completes a circuit through the coil 193 and resistor 195. The relay also operates the changeover contacts 196, 197 which reverse the rotor connections of the motor 82 so that the torque output of the motor is reversed.

Since the motor 82 is connected to the middle of the differential gear 83 it normally applies equal torques to the two shafts 77, 78. The motor, which conveniently comprises a D. C. motor with a constant current supply limited to very much less than the normal rating of the motor, provides only sufficient torque to take up the backlash due to the couplings 75, 76. When the motor is reversed, it will rotate to take up the backlash in the opposite direction. The two shafts 77, 78 are loaded with friction springs of different strengths so that there are small opposing torques to the motor. The result is that the motor first takes up all the backlash on the shaft with the small torque spring and then proceeds to take up the backlash on the other shaft. On the display unit therefore, the stylus will first move in one co-ordinate direction relative to the chart for a distance determined by the amount of backlash on one shaft and will then move in the second co-ordinate direction at right angles for a distance determined by the backlash on the other shaft.

The shaft with the stronger spring resistance is arranged to operate a pair of contacts when the full backlash has been taken up on this shaft. These contacts which are indicated by the reference 198 on Figure 9, short the coil 193 of the relay which then releases and restores the rotor connections of motor 82 to normal. The motor therefore is reversed and proceeds to take up backlash in the opposite direction. As before, it will first take up the backlash on the shaft with the smaller torque spring and subsequently on the other shaft. The stylus moves relative to the chart to complete the remaining two sides of a square. It will be noted that it does not matter for how long the timing contact 191 is operated so long as this contact is restored to charge the condenser before the next timing mark is required.

It will have been seen that the apparatus described provides a continuous indication on a chart of the position of the vehicle, and also a record of the track taken by the vehicle. If the vehicle is to follow a pre-determined course, the required track may be marked beforehand on the chart. The divergence of the vehicle from the pre-determined track would then be indicated by the position of the stylus relative to the marked track. It will be appreciated that if some more simple indication be required, it would readily be possible to make the stylus of conducting material, and to provide contact strips on the chart on either side of the required track, the strips and stylus being connected to a left or right indicating meter.

In the event of it being required that the vehicle shall diverge from a pre-selected course, the direction of the track along which it is desired to guide the vehicle can be defined as the ratio of the rates of change of two co-ordinates. Various such ratios may be marked on the transparent cursor plates as radial lines diverging from the stylus. Thus the vehicle can be kept on a selected track by ensuring that the track recorded by the stylus remains along one of the radial lines.

We claim:

1. For use with a radio navigation system having means on a vehicle for producing at least two sets of electrical signals providing positional information from which the chart position of the vehicle can be determined, a chart position indicating apparatus comprising: a chart movable to and fro in one direction; an index movable to and fro over the chart in a transverse direction; electro-mechanical means responsive to one of said sets of signals for moving the chart in said one direction in accordance with changes in said signals; electro-mechanical means responsive to another of said sets of signals for moving the index over the chart in said transverse direction in accordance with changes in said signals; a stylus carried by said index and arranged to mark the chart so that the movements of the index relative to the chart are recorded thereon; shifting means operable upon periodic actuation to displace and return the stylus relative to the chart, whereby marks may be made on the recorded track of the vehicle at successive periodically occurring instants; and actuating means coupled to said shifting means and responsive to periodic modification of one of said sets of signals for actuating said shifting means.

2. A chart position indicating apparatus according to claim 1 including a time-keeping mechanism arranged to actuate said shifting means, and wherein said actuating means is coupled to said time-keeping mechanism for synchronizing said time-keeping mechanism with periodic modifications of said set of signals.

3. For use with a radio navigation system having means on a vehicle for producing at least two sets of electrical signals providing positional information from which the chart position of the vehicle can be determined, a chart position indicating apparatus comprising: a chart movable to and fro in one direction; an index movable to and fro over the chart in a transverse direction; electro-mechanical means responsive to one of said sets of signals for moving the chart in said one direction in accordance with changes in said signals; electro-mechanical means responsive to another of said sets of signals for moving the index over the chart in said transverse direction in accordance with changes in said signals; and coupling means coupling said electro-mechanical means to said chart and to said index respectively, said coupling means comprising a rotatable member coupled to each of said electro-mechanical means for rotation thereby in a direction and by an amount in accordance with the changes in one of said sets of signals, a pair of output shafts, an adjustable gear box for selectively coupling at least two of said members to said two output shafts to rotate said shafts respectively in proportion to the rotation of said members, a first electrical transmission system drivably connecting said chart to one of said output shafts, and a second electrical transmission system drivably connecting said index to another of said output shafts.

4. A chart position indicating apparatus according to claim 3 wherein one of said electro-mechanical means is arranged to effect a movement proportional to the sum of the distances represented by said two sets of signals and wherein the other electro-mechanical means is arranged to effect a movement proportional to the difference of the distances represented by said two sets of signals.

5. A chart position indicating apparatus according to claim 3, including selecting means coacting with said coupling means for selectively coupling said electro-mechanical means to said output shafts to thereby effect a movement of one of said output shafts proportional to the difference of the distances represented by any selected pair of said sets of signals, and to effect a movement of the other of said output shafts proportional to the sum of the distances represented by said selected pair of said sets of signals.

6. A chart position indicating apparatus according to claim 5 wherein said selecting means is operable to an alternate position so coupling said electro-mechanical means to said output shafts as to thereby effect a movement of one of said output shafts proportional to the difference in the distances represented by any selected pair of said sets of signals, and to effect a movement of the other of said output shafts proportional to the difference of the distances represented by another pair of said sets of signals.

7. A chart position indicating apparatus according to claim 5 wherein said selecting means is operable to an alternate position so coupling said electro-mechanical means to said output shafts as to thereby effect a movement of one of said output shafts proportional to the difference in the distances represented by any selected pair of said sets of signals, and to effect a movement of the other of said output shafts proportional to the sum of the distances represented by three of said sets of signals.

8. In an apparatus for plotting the course of a vehicle, the combination of: radio navigation receiver means on said vehicle for producing at least two pairs of equal frequency radio frequency signals wherein the phase difference between the signals of each pair depends on the position of said vehicle; phase discriminator means coupled to said receiver means for producing from each of said pairs of signals a pair of direct potentials respectively proportional to the sine and cosine of said phase difference; comparison means coupled to said phase discriminator means for vectorially combining in quadrature the direct potentials of each of said pairs thereof to produce summation potentials having vectorial orientations corresponding to said phase differences; a first shaft; a first servo-mechanism coupling said first shaft to said comparison means for rotating said first shaft in correspondence with the rotation of one of said summation potentials; a second shaft; a second servo-mechanism coupling said second shaft to said comparison means for rotating said second shaft in correspondence with the rotation of another of said summation potentials, whereby the rotation of said shafts is representative of the two components of the motion of said vehicle; a chart; a stylus; a support for said chart and said stylus; means mounting said chart and said stylus for independent movement relative to said support to permit said stylus to be moved to any position on said chart; and coupling means coupling said shafts to said stylus and said chart for moving said chart and said stylus relative to each other in proportion to the vector sum of the component rotations of said shafts.

9. The apparatus of claim 8 including ratio changing means interposed between said comparison means and said chart and stylus for changing the ratio of proportionality of said relative movement to the motion of said vehicle.

References Cited in the file of this patent

UNITED STATES PATENTS

| | | |
|---|---|---|
| 1,113,747 | Boyden | Oct. 13, 1914 |
| 1,972,388 | Mack | Sept. 4, 1934 |
| 1,975,180 | Sparling | Oct. 2, 1934 |
| 2,058,306 | Fowler | Oct. 20, 1936 |
| 2,149,440 | Jackson | Mar. 7, 1939 |
| 2,202,634 | Mack | May 28, 1940 |
| 2,407,294 | Shockley et al. | Sept. 10, 1946 |
| 2,419,576 | Levy | Apr. 29, 1947 |
| 2,422,025 | Luck | June 10, 1947 |
| 2,530,428 | Gray | Nov. 21, 1950 |
| 2,534,820 | Hurvitz | Dec. 19, 1950 |
| 2,561,345 | Deloraine | July 24, 1951 |
| 2,569,328 | Omberg | Sept. 25, 1951 |

FOREIGN PATENTS

| | | |
|---|---|---|
| 708,385 | Germany | July 19, 1941 |